United States Patent [19]

Fukushima

[11] Patent Number: 5,363,206
[45] Date of Patent: Nov. 8, 1994

[54] FACSIMILE APPARATUS CAPABLE OF RE-TRANSMITTING THE SAME IMAGE DATA

[75] Inventor: Shigenobu Fukushima, Toyokawa, Japan

[73] Assignee: Minolta Camera Kabushiki Kaisha, Osaka, Japan

[21] Appl. No.: 705,721

[22] Filed: May 24, 1991

[30] Foreign Application Priority Data

May 29, 1990 [JP] Japan .................................. 2-138766

[51] Int. Cl.$^5$ .............................................. H04N 1/00
[52] U.S. Cl. ................................. 358/440; 358/444; 358/468; 358/400; 358/407
[58] Field of Search ............. 358/426, 444, 427, 400, 358/440, 404, 434, 435, 439, 401, 437, 782, 765, 438, 405, 407

[56] References Cited

U.S. PATENT DOCUMENTS 4,825,296  4/1989  Wagensonner et al. ............... 358/78
5,068,745  11/1991  Shimura ............................... 358/462
5,121,221  6/1992  Hamano et al. ....................... 358/462

FOREIGN PATENT DOCUMENTS 60-8670   3/1985  Japan .
60-64572  4/1985  Japan .
61-34712  8/1986  Japan .

OTHER PUBLICATIONS

Catalogue of "NEFAX D45", May 1989.

*Primary Examiner*—Edward L. Coles, Sr.
*Assistant Examiner*—Fan Lee
*Attorney, Agent, or Firm*—Willian Brinks Hofer Gilson & Lione

[57] ABSTRACT

A facsimile apparatus according to the present invention includes a reading device for reading image data of an original to be transmitted, transmission device for transmitting the image data read by the reading device, a memory for storing the image data read by the reading device in parallel with a transmission of the image data carried out by the transmission device, a commanding device for commanding a transmission of the image data stored in the memory and a control device responsive for controlling the transmission device to start the transmission of the image data stored in the memory.

8 Claims, 18 Drawing Sheets

FIG. 5

| SET DESTINATION | INDICATION a |

| LINE ERROR OCCURS ORIGINAL TO BE DISCHARGED | INDICATION b |

| MEMORY OVER ORIGINAL TO BE DISCHARGED | INDICATION c |

| TRANSMISSION COMPLETED | INDICATION d |

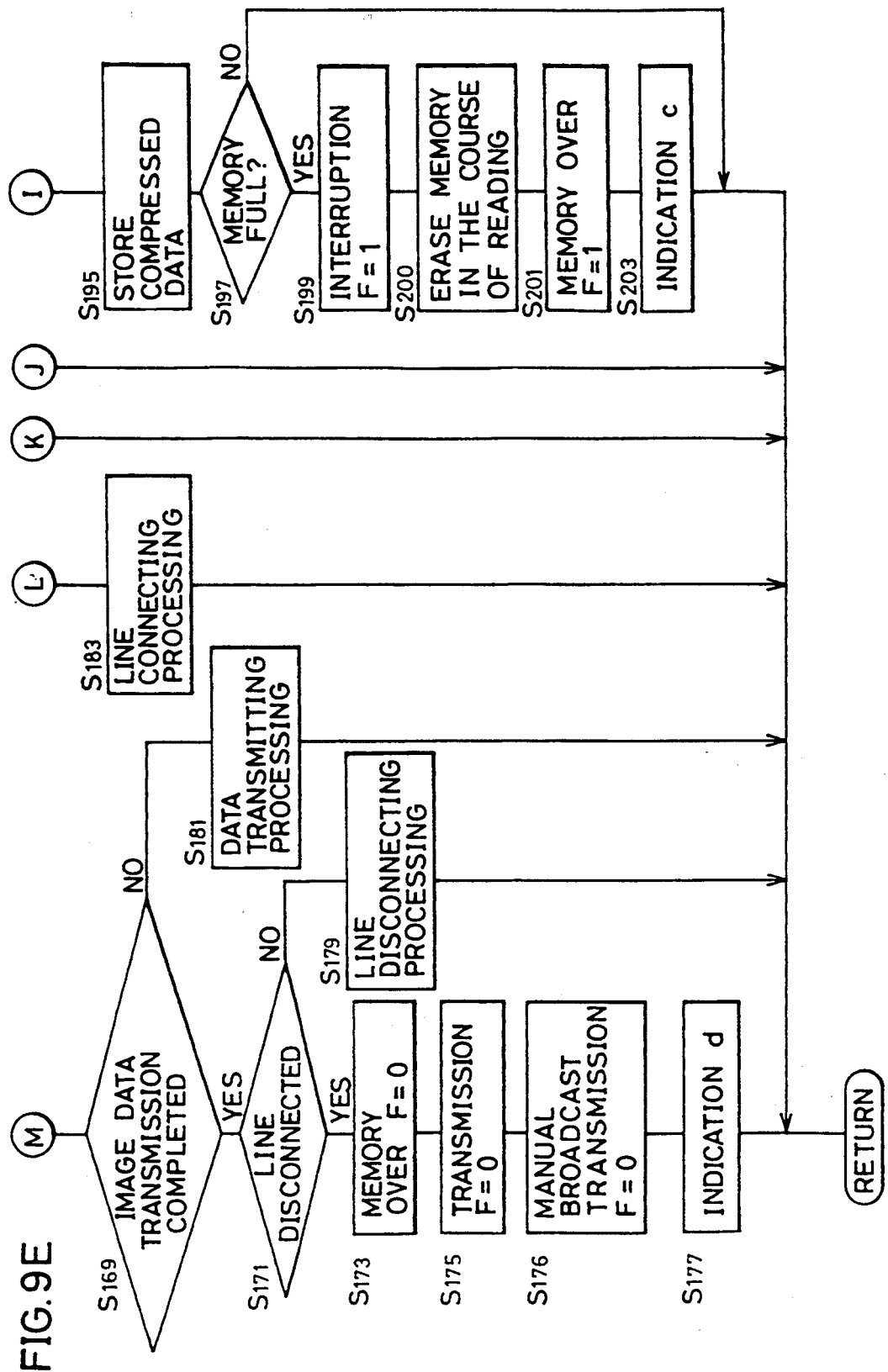

FACSIMILE APPARATUS CAPABLE OF RE-TRANSMITTING THE SAME IMAGE DATA

BACKGROUND OF THE INVENTION

1. Field of the Invention

The present invention relates generally to facsimile apparatuses, and more particularly, to facsimile apparatuses capable of, after finishing transmission of information, manually re-transmitting the same information to a desired receiving apparatus.

2. Description of the Related Art

A conventional facsimile apparatus reads an original and at the same time transmits image data of the read original to a desired destination, which means that the image data transmission is completed at the end of the reading of the original, that is, means that reading operation is carried out with transmitting operation.

Such facsimile apparatus enables rapid transmission. However, when the information which has been once transmitted is to be transmitted to another destination, the apparatus requires the reading operation to be performed from the beginning, which reduces ease of handling of the apparatus. In addition, the user is not allowed to take away the original, but has to keep waiting at the apparatus until another transmission is completed.

SUMMARY OF THE INVENTION

An object of the present invention is to improve ease of handling of a facsimile apparatus.

Another object of the present invention is to make easier re-transmission of image data which has been transmitted by a facsimile apparatus.

Still further object of the present invention is to use a memory of a facsimile apparatus more efficiently.

Still further object of the present invention is to reduce a load of a compressing/expanding portion of a facsimile apparatus.

In order to achieve the above-described objects, a facsimile apparatus according to one aspect of the present invention includes reading means for reading image data of an original to be transmitted, transmitting means for transmitting the image data read by the reading means, storing means for storing the image data read by the reading means in parallel with the transmission of the image data carried out by the transmitting means, and commanding means for commanding transmission of the image data stored in the storing means.

Thus structured facsimile apparatus transmits the stored image data in response to a transmission command given by the commanding means and therefore, the apparatus enables transmission of the same image data with ease.

In order to achieve the above-described objects, a facsimile apparatus according to another aspect of the present invention includes reading means for reading image data of an original to be transmitted, first compressing means for converting the image data read by the reading means into first compressed image data on a first compression system, transmitting means for transmitting the converted first compressed image data, first storing means for storing the converted first compressed image data, second compressing means for reading the first compressed image data stored in the first storing means to convert the same into second compressed image data on a second compression system different from the first compression system, second storing means for storing the converted second compressed image data, comparing means for comparing compression efficiency of the first compressed image data with that of the second compressed image data to determine a compression system of higher compression efficiency, storage controlling means for controlling the first and the second storing means to select and store the compressed image data having higher compression efficiency determined by the comparing means, destination setting means for setting a destination of transmission of the image data, commanding means for commanding transmission of the image data to the destination, and transmission controlling means responsive to the transmission command given by the commanding means for controlling the transmitting means to start transmission of the compressed image data selected by the storage controlling means to the destination set by the destination setting means.

Thus structure facsimile apparatus stores and transmits compressed image data having high compression efficiency, so that improved efficiency of use of a memory can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing various indications given at a display portion of FIG. 2.

FIGS. 9A, 9B, 9C, 9D and 9E are diagrams specifically showing a transmission routine of FIG. 7.

DESCRIPTION OF THE PREFERRED EMBODIMENTS

Figure 1:
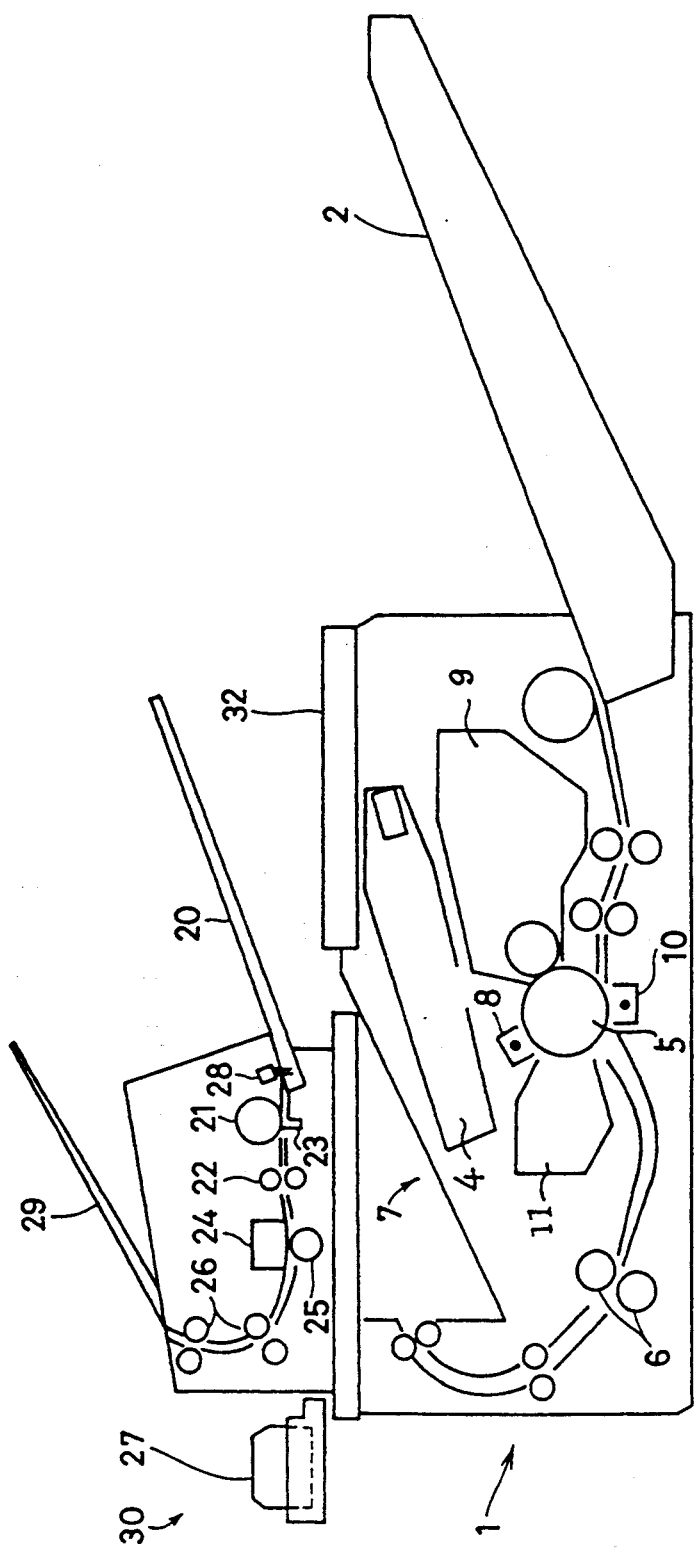
FIG. 1 is a schematic sectional view of an arrangement of a facsimile apparatus according to one embodiment of the present invention.

FIG. 1 is a sectional view of a facsimile apparatus according to one embodiment of the present invention.

The facsimile apparatus is constituted by a recording portion 1 and a reading portion 30. The recording portion 1 comprises a laser beam printer, operation of which will be briefly described in the following.

First, a charger 8 charges a photoreceptor drum 5 on which electrostatic latent image is formed by an optical system 4. Toner of a developing unit 9 is attached to this electrostatic latent image. Meanwhile, a paper feed cassette 2 stores cut sheets of paper therein which are fed toward the photoreceptor drum one by one by a paper feed roller or the like. The toner attached to the photoreceptor drum is transferred onto the paper by a transfer charger 10, fixed thereon by a fixing device 6 and then, discharged into a tray 7. The toner that has remained unattached to the paper is collected by a cleaner 11 to complete one cycle of the printing operation.

Operation of the reading portion 30 will be described below.

An original set on a tray 20 is sensed by a sensor 28 and the head of the original is lifted up to a predetermined position by a lift-up plate 23. Then, a pick-up roller 21 sequentially feeds the originals stored in the tray 20 from the top one by one. The originals are conveyed by rollers 22, 25 and 26 to a sensor 24 wherein they are read as digital image and then, the originals are last discharged to a discharging tray 29 last.

A hand set 27 for interface with a telephone line is provided at the side of the reading portion and an operation panel 32 for setting various operations to be performed in transmission/reception is provided below the tray 20.

Figure 2:
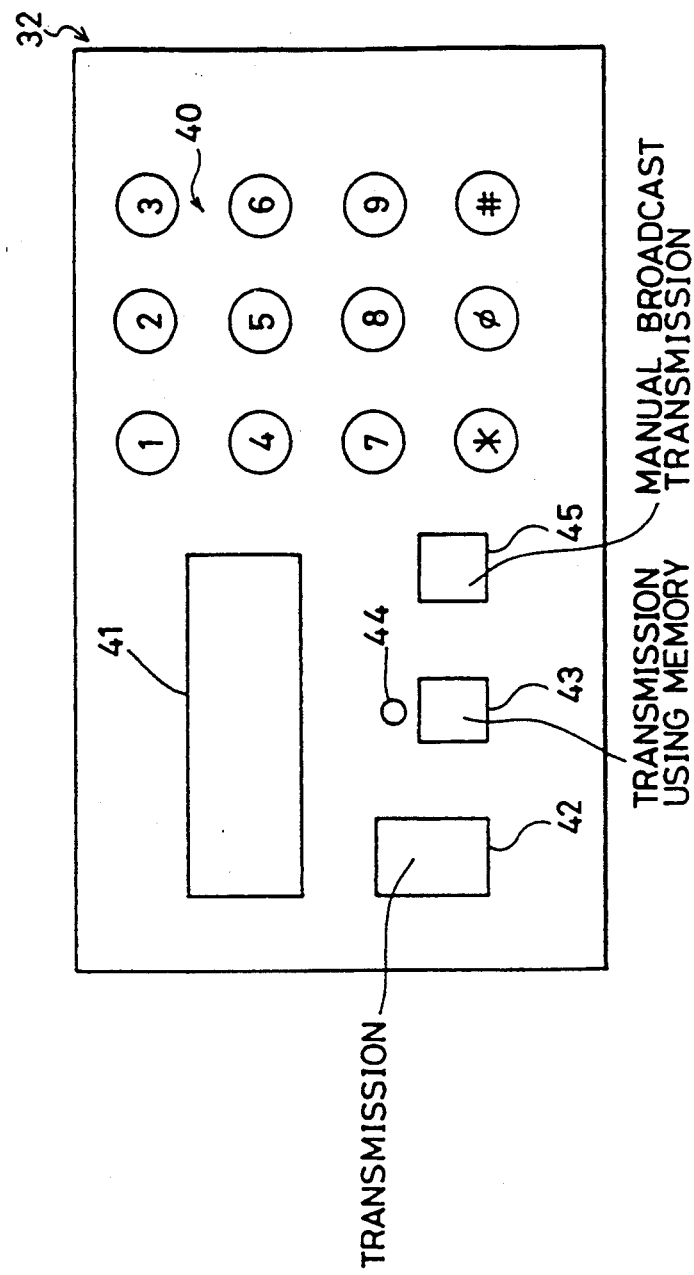
FIG. 2 is a plan view showing an operation panel shown in FIG. 1.

FIG. 2 is a plan view of the operation panel of FIG. 1.

In the drawing, the panel is provided with a group of ten keys 40, a liquid crystal panel 41, operation keys 42, 43 and 45 and a LED 44.

The ten keys 40 are used for entering a telephone number of a destination. The liquid crystal panel 41 is used for displaying an operation state of the facsimile apparatus or instructions to an operator. The key 42 is used for starting a transmitting operation of the facsimile apparatus, the key 43 for switching between transmission using a memory and transmission without using a memory and the LED 44 for showing indication of the transmission using or without using a memory. The key 45 is used for manual broadcast transmission which will be described later.

Figure 3:
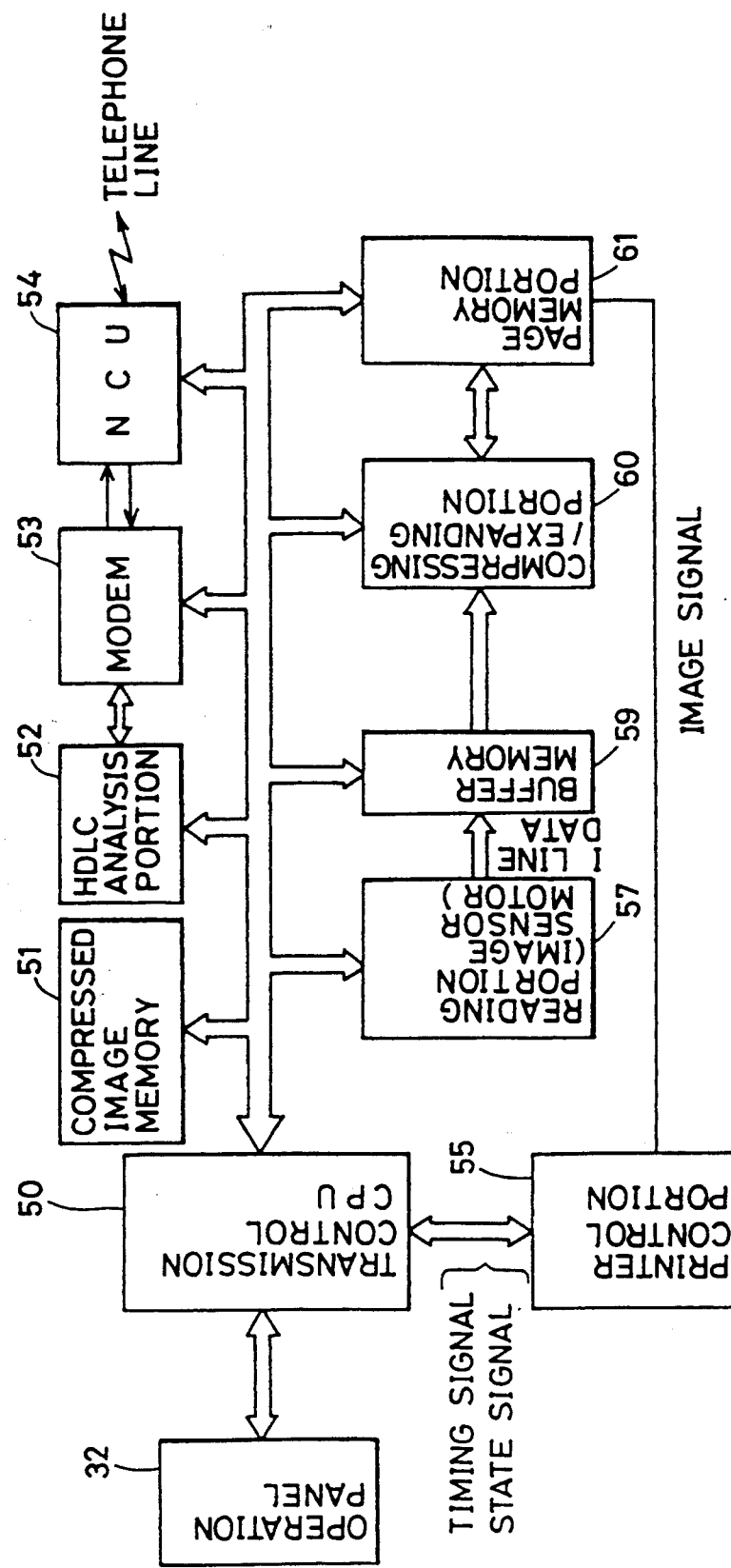
FIG. 3 is a block diagram showing a specific arrangement of a control portion of FIG. 1.

FIG. 3 is a block diagram of a control portion of the facsimile apparatus according to one embodiment of the present invention.

In the diagram, the control portion is mainly comprised of a transmission control CPU 50, the operation panel portion 32 and a printer control portion 55 which are connected to each other through a communication path for transmitting mode information and a timing signal line. Operation of the control portion will be described below following the operation of the facsimile apparatus.

A transmitting operation will be first described. The transmitting operation includes transmission using a memory and transmission without using a memory, each of which will be described in the following.

(1) Transmission using a memory

The sensor 28 in a reading portion 57 detects am original being set on the tray 20 and the detection information is transmitted to the CPU 50 which causes the operation panel portion 32 to display a request for entry of a facsimile number at its display. Upon the entry of the fax number by means of the ten key group 40, a motor and an image sensor of the reading portion 57 are synchronized with each other to read the original, thereby obtaining an image signal of each line thereof, and data of the line is transmitted to a buffer memory 59.

At the same time, a compressing/expanding portion 60 compresses the image data in the buffer memory 59 and the compressed image data is stored in a compressed image memory 51.

Upon completion of the reading of the original, the CPU 50 calls a facsimile apparatus on a receiver side through the telephone line by using a modem 53 and an NCU 54. When the line is connected, the compressed data stored in the compressed image memory 51 is supplied to the compressing/expanding portion 60 wherein the data is expanded and then, stored in a page memory 61 as the original data. Subsequently, the stored image data undergoes an automatic scale-down processing according to the memory capacity of the facsimile apparatus on the receiver side is capable of storing. The scaled-down data is compressed in the compressing/expanding portion 60 on a coding system of the receiver-side facsimile apparatus and again stored in another memory area of the compressed image memory 51. These expanding and compressing operations are alternately carried out on a block basis comprising several line data.

While compression is performed according to the processing capability of the receiver-side facsimile apparatus, the obtained compressed data is processed by a HDLC analysis portion 52 under to the HDLC standard and then, transmitted onto the telephone line through the modem 53 and the NCU 54. After all the image is transmitted, the line is disconnected by following a disconnection procedure to terminate the transmitting operation.

(2) Transmission without using a memory

The procedure from setting of an original on the tray 20 to entry of a facsimile number is the same as that of the above-described transmission by using a memory. Thereafter, while the line is connected and the image data is read by the image sensor and the motor of the reading portion 57 and stored in the buffer memory 59. At the same time, the image data is converted into compressed data in the compressing/expanding portion 60 according to the size of the copy paper and the compression system of the destination and the compressed image data is transmitted onto the telephone line through the HDLC analysis portion 52, the modem 53 and the NCU 54.

Receiving operation, which is not closely related to the object of the present invention, will be briefly described in the following.

When the line is connected in response to a call through the telephone line, the received compressed image data is expanded to be stored in the page memory portion 61 as actual image data. At the same time, the signal of the image data is transferred to the printer control portion 55 and recorded in synchronization with the mechanical control of the printer. Repetition of this operation as many times as the number of predetermined pages completes the recording operation.

Manual broadcast transmission will be described.

Broadcast transmitting function or transmission according to program which a current and common facsimile apparatus performs is sequential transmission of image of an original to a plurality of destinations (telephone numbers) which have been initially set.

On the other hand, the manual broadcast transmission according to the present invention only requires entry of a telephone number to re-transmit the contents of the already transmitted original to the party having the telephone number.

As a result, the present invention is advantageous over a conventional broadcast transmitting apparatus in the following respects.

(1) Ease of addition/change of a destination (2) No need of initially setting a destination, thereby obtaining more flexibility in case of erroneous transmission or the like (3) No need of initial setting for single broadcast transmission, making the apparatus easier to use.

Furthermore, when the same original is to be transmitted to, for example, two destinations, in normal transmission, second reading of the original can be omitted to save labor of the operator.

Figure 6:
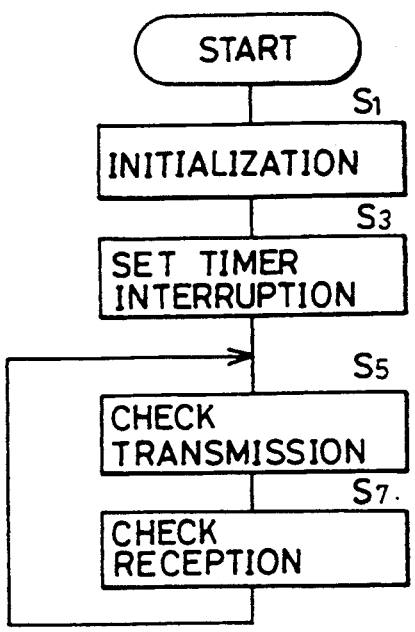
FIG. 6 is a flow chart showing schematic control of a transmission control CPU of FIG. 3.
Figure 7:
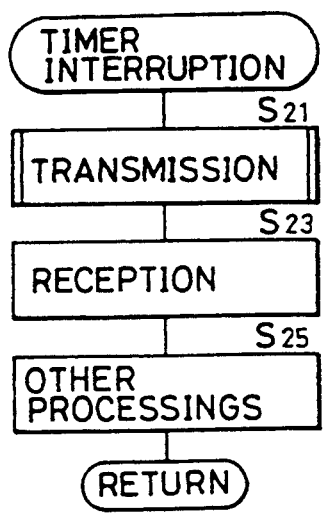
FIG. 7 is a flow chart of timer interruption in the control of the transmission control CPU of FIG. 3.

FIGS. 6 and 7 are schematic control flows of the transmission control CPU 50 shown in FIG. 3.

First, a register, various input/output ports, various flags and the like are initialized at step S1. Then, at step S3, timer interruption for periodically calling an interruption service routine shown in FIG. 7 is set.

Steps S5 through S7 represent several check routines for ensuring desired processing of the respective sequences included in the interruption service routine (for example, ensuring transmission when it is to be executed). When the processing is completed until step S7, the operation returns again to S5 to repeat the same check routine.

Although the details of the transmission check routine S5 will be described later, transmission check routine (S7) is not closely related to the object of the present invention and therefore no details thereof will be described herein.

FIG. 7 shows a timer interruption service routine set in FIG. 6.

The service routine comprises two sequences, transmission and reception. The details of step S21 will be described later. Receiving operation at step S23 is not closely related to the present invention and therefore no specific description will be made thereof.

Figure 8A:
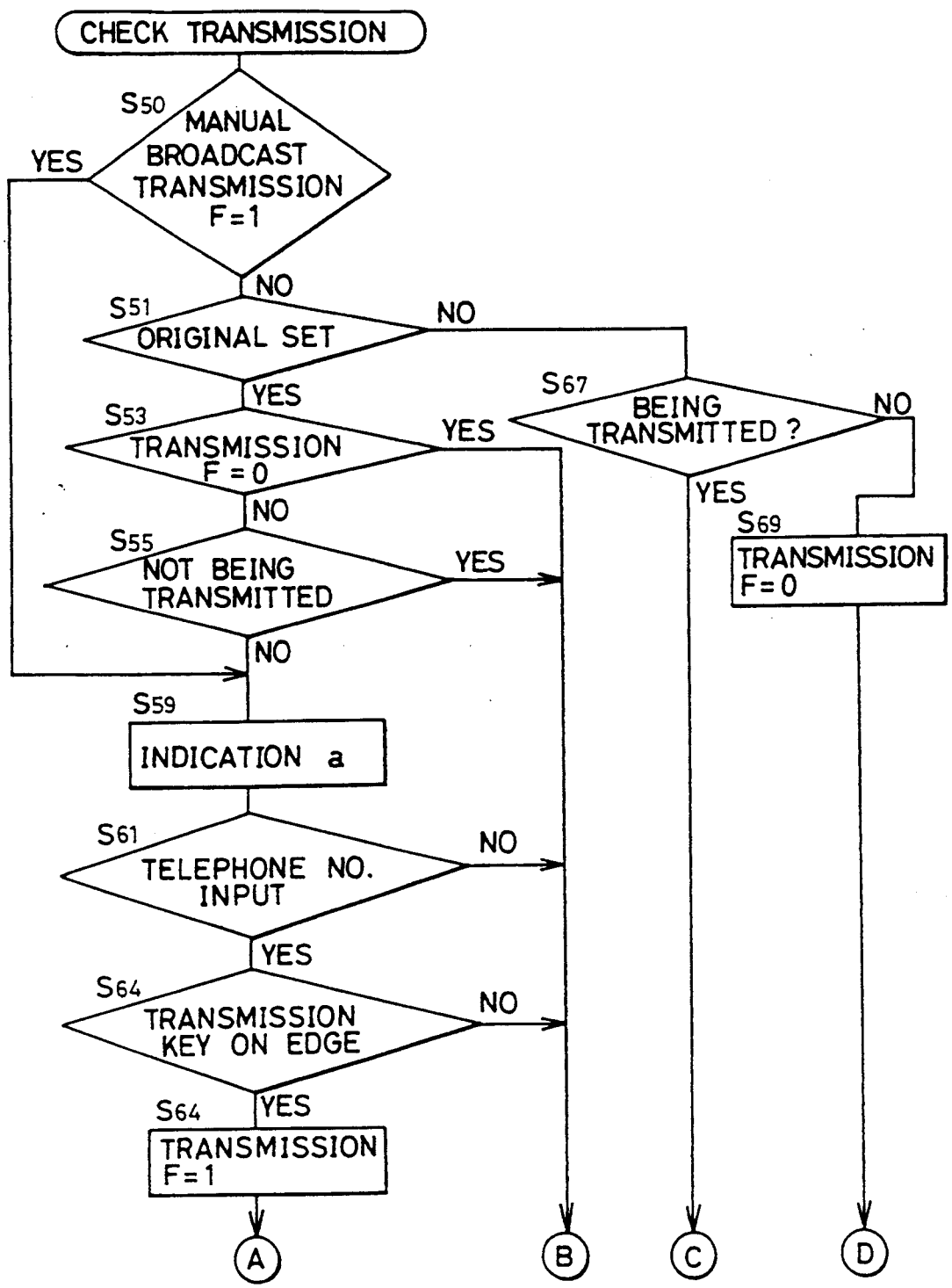
FIGS. 8A and 8B are diagrams specifically showing a transmission check routine of FIG. 6.
Figure 8B:
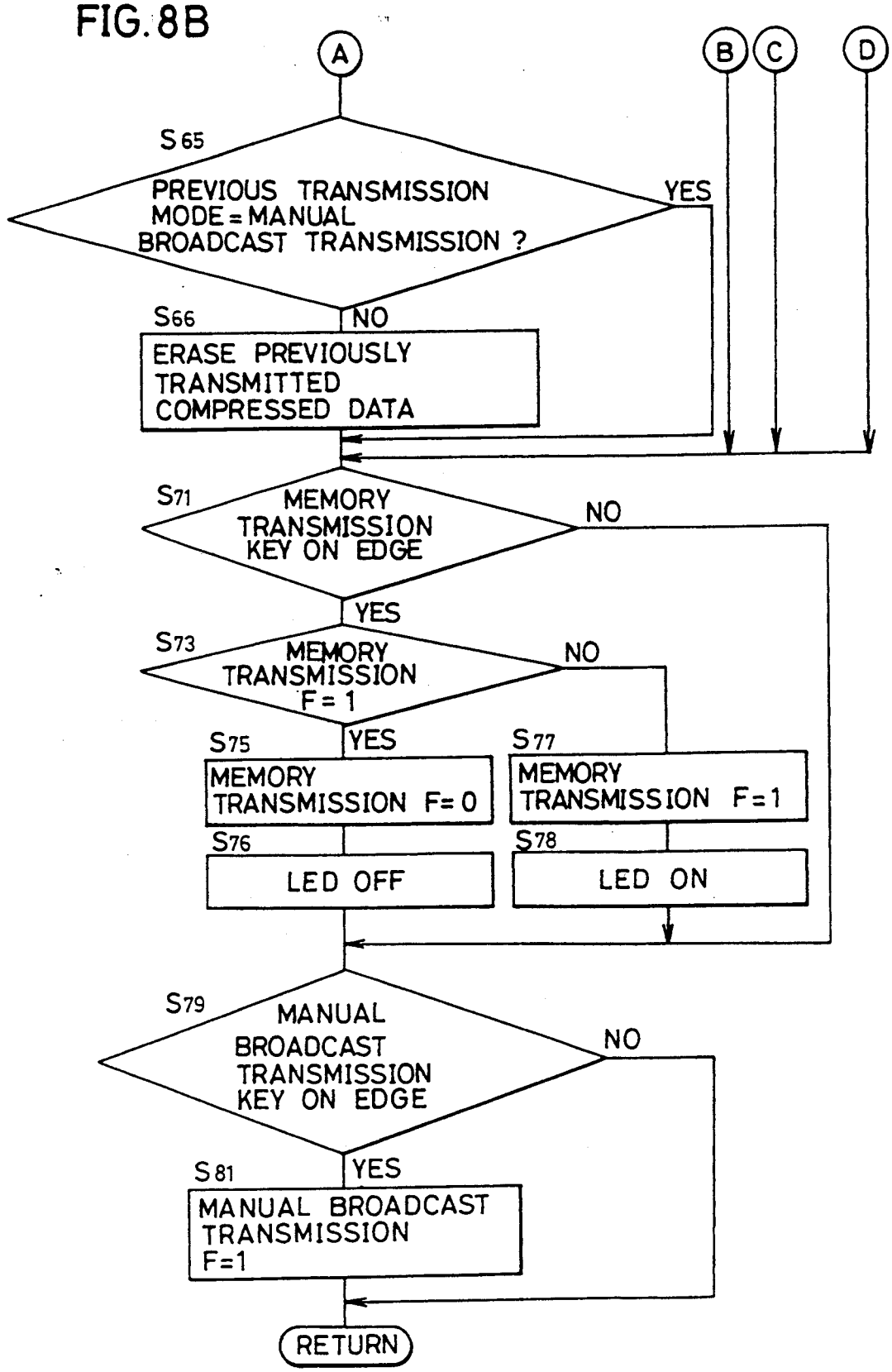

FIGS. 8A and 8B are flow charts showing specific contents of the transmission check routine of FIG. 6.

First, at step S50, determination is made as to whether manual broadcast transmission function is set or not and when the manual broadcast transmission is set, the operation enters step S59 and proceeds to the following steps. If the manual broadcast transmission is not set, setting state of the original is detected at step S51. When the original is set, the operation proceeds to step S55 provided that a transmission flag is not reset in step S53 and the apparatus is not at a transmission state in step S55. The transmission flag of "1" indicates that transmission is under way, but in the strict sense, transmission includes the operation up to discharging of the original or the like.

Then, in step S59, the indication a shown in FIG. 5 is displayed at the display portion 41 to call the operator's attention to an entry of a telephone number, and when the telephone number is entered, the operation proceeds to step S63.

At step S63, detection of ON edge of the transmission key 42 is carried out and when the ON edge is detected, the transmission flag is set at step S64. The previously transmitted compressed image data is erased (S66) providing that the previous transmission mode is not manual broadcast transmission at step S65. The reason why the compressed image data is not erased immediately after the transmission is that there might arise necessity of re-transmitting the previously transmitted compressed image data as the manual broadcast transmission. Start of transmission of another original by the operator is considered that such necessity will not arise and therefore, the data of the last original is erased for the first time at step S66.

If determination is made at step S65 that the previous transmission mode is the manual broadcast transmission, the data is not erased because the previously transmitted compressed image data might be again transmitted in the manual broadcast transmission.

When the original is not reset at step S51, determination is made as to whether transmission is under way or not at step S67. When the transmission is under way, the operation directly goes to step S71, while the transmission is not under way, the transmission flag is reset at step S69 and then the operation enters step S71.

Steps S71 through S78 constitute a routine for switching between transmission using a memory and transmission without using the same. Every time the memory transmission key 43 is struck at step S71, determination is made as to whether transmission will be made by using a memory or without using a memory at step S73 by determining the contents of the memory transmission flag and then, the result of the determination is displayed at the LED 44 at step S76 or step S78. Step S79 and S81 show an operation of setting the manual broadcast transmission flag to "1" when the manual broadcast transmission key is struck.

FIGS. 9A, 9B, 9C, 9D and 9E are flow charts showing specific contents of the transmission proceeding of FIG. 7.

Figure 9A:
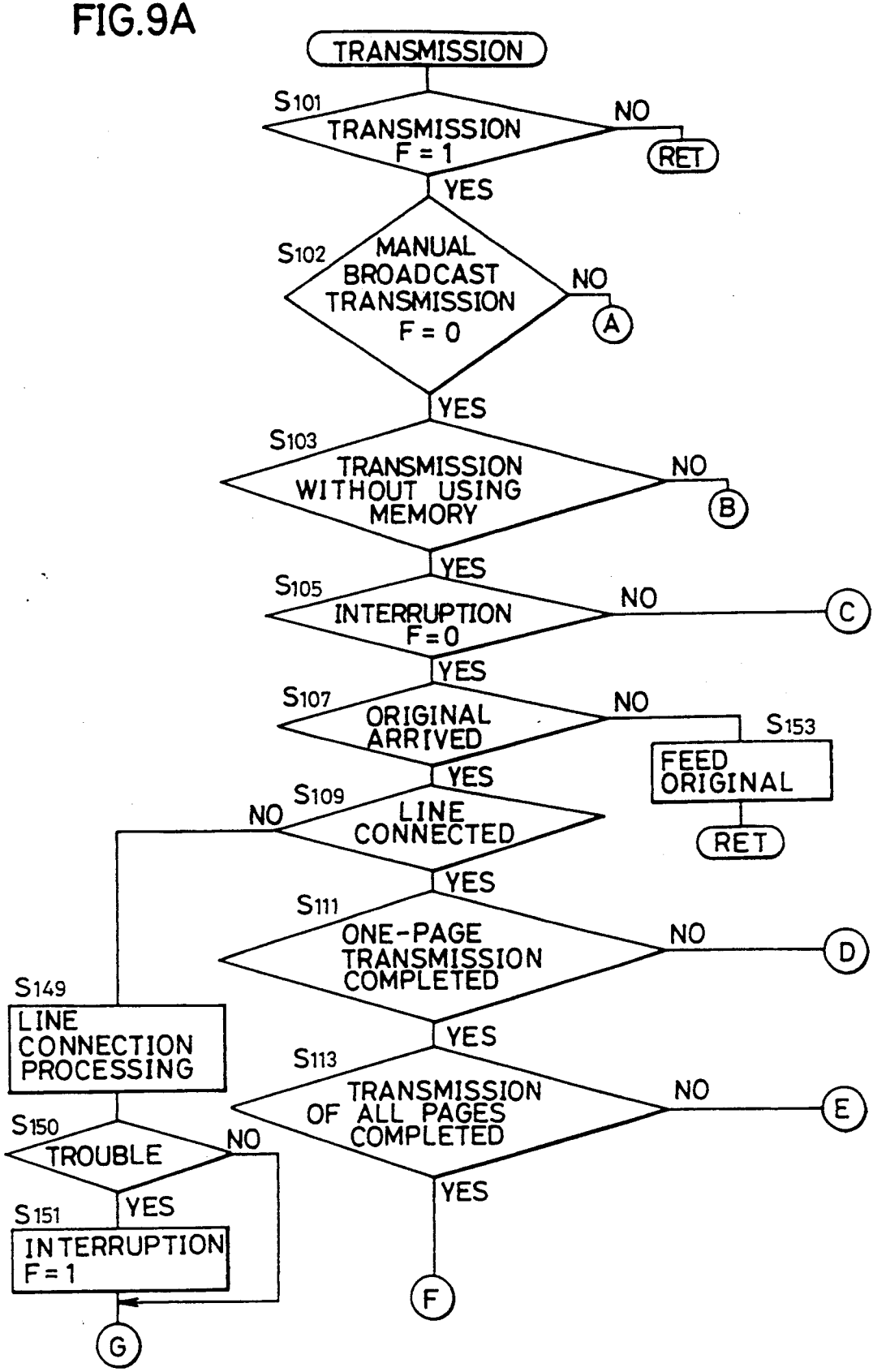
Figure 9B:
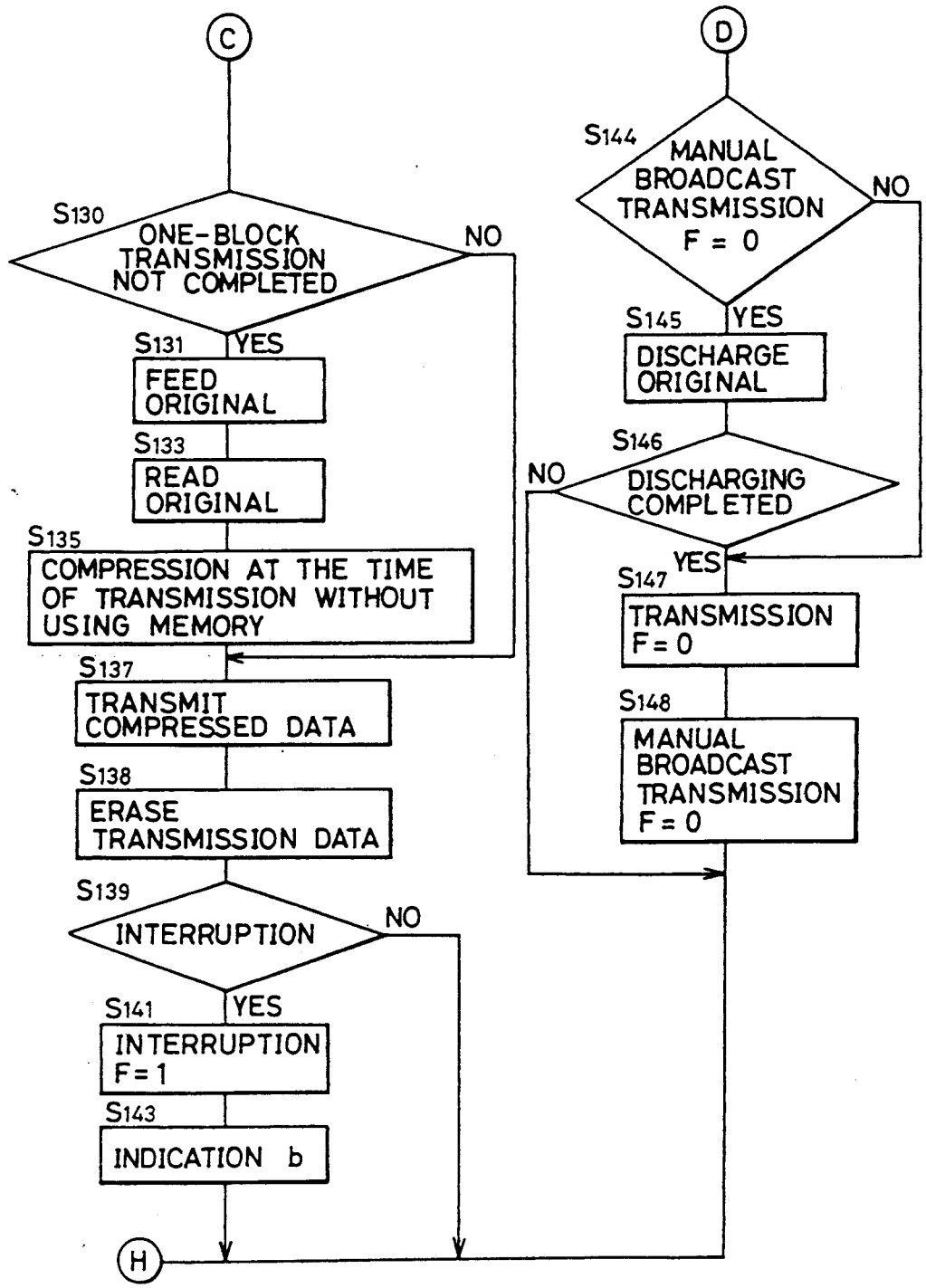
Figure 9C:
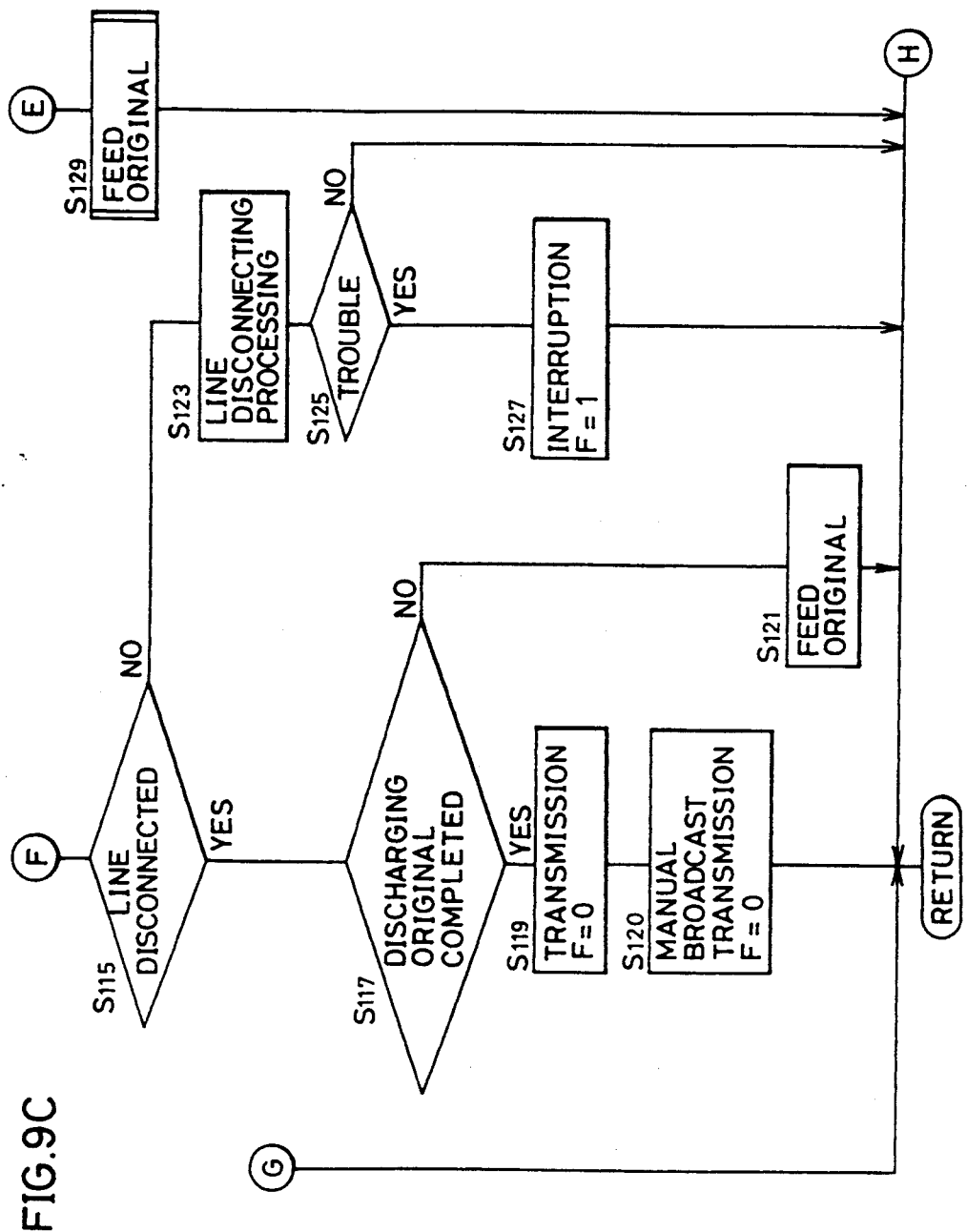
Figure 9D:
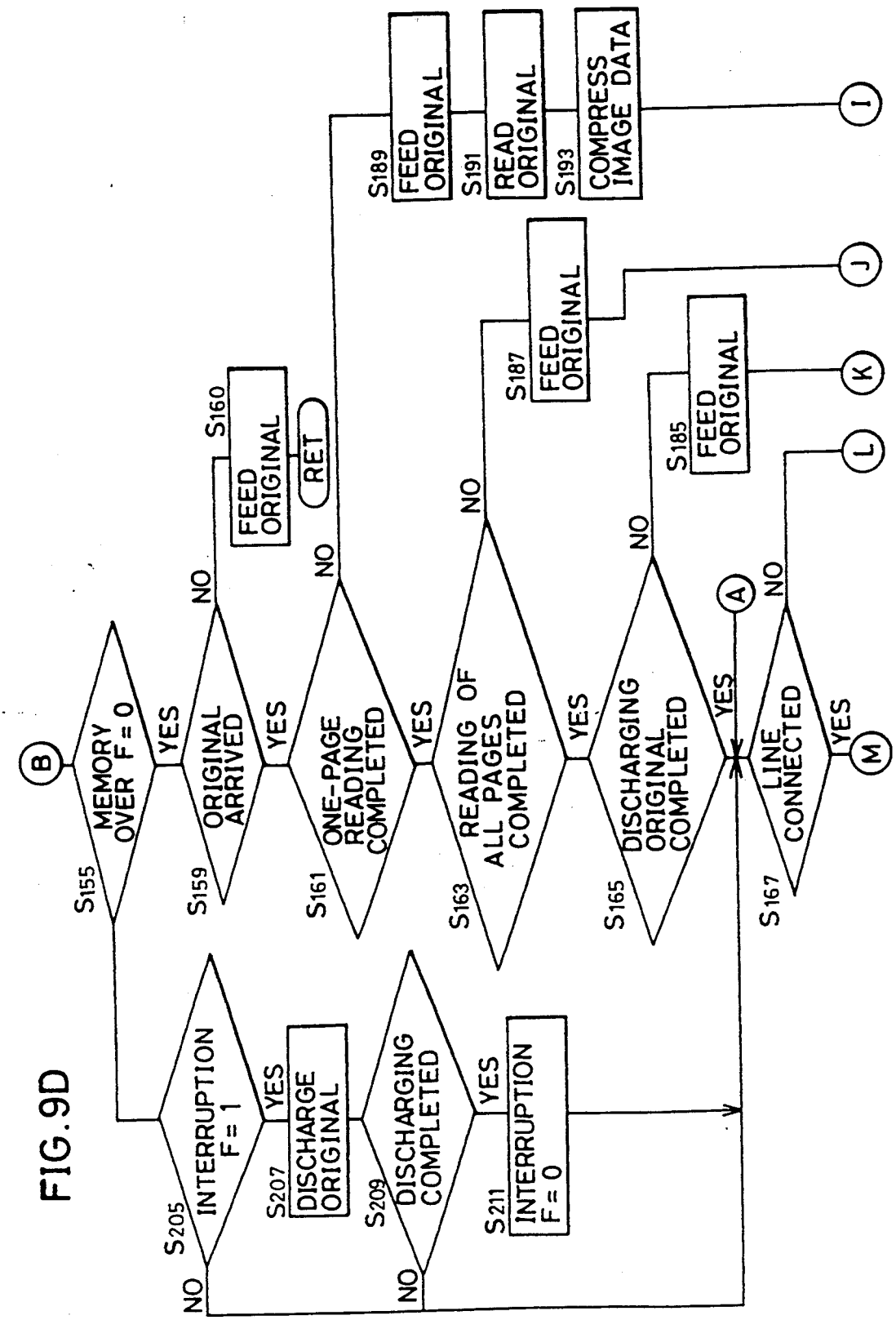

FIGS. 9A, 9B and 9C each show a routine of a processing for transmission without using memory and FIGS. 9D and 9E each show a routine of a processing for transmission by using a memory.

First, determination is made at step S101 as to whether the transmission flag is "1" or not. When the flag is set to "1", determination is made at step S102 as to whether the manual broadcast transmission flag is "0" or not. When the determination is made at step S102 that the transmission mode is manual broadcast transmission which is transmission mode using a memory, thereby requiring no reading of the original and therefore, the operation proceeds to step S167 and the following steps. Then, determination is made at step S103 as to whether transmission is made by using a memory or not. The operation proceed to step S105 or step S155 depending on the result of the determination.

Step S105 and steps thereafter show a processing for transmission without using a memory. First, at step S105, determination is made of a state of the interruption flag which is to be set to "1" when problem on the line occurs due to deterioration in the state of the line, malfunction of the receiving side apparatus or the like. The interruption flag can be set for other reasons at the time of transmission using a memory.

When the interruption flag is set, the operation proceeds to step S144 and the following steps, and when the transmission mode is not the manual broadcast transmission (YES at step S144), all the originals are discharged to set the transmission flag to "0" (S147) and then, the manual broadcast transmission flag is set to at step S148 and the operation returns to the main routine.

When the interruption flag is reset at step S105, transmitting operation being under way at present is checked at each of steps S107 through S117, from which step the operation proceeds to the corresponding step.

The original feeding operation is carried out at step S153 until the first original reaches the reading sensor for the first time.

Then, the line connecting processing is carried out at step S147 and the following steps until the line connection is completed at step S109 and if the connection is found defective, the interruption flag is set to "1" at step S151 and then, the operation returns to the main routine.

Then, determination is made at step S111 as to whether transmission of image data of one page has been completed or not. If not completed, determination is made at step S130 as to whether transmission of one block has not been completed. Herein, one block represents any unit at least smaller than actual image of one page, for example, one block includes several lines.

If one block of transmission has not been completed, the original is fed at step S131 and reading thereof is carried out at step S133. Subsequently at step S135, the read original image data is compressed to be stored, which will be specifically described later.

Then, at step S137, the compressed data is transmitted and at step S138 the already transmitted data is erased. As described in the foregoing, transmission of compressed data is carried out for every block in this embodiment.

When trouble occurs such as disconnection of the line or the like, the operation proceeds from step S139 to S141 to set the interruption flag, and then, the indication b of FIG. 5 is displayed.

As described above, when the one-page transmission is completed (YES at step S111), determination is made at step S113 as to whether transmission of all the pages is completed or not and if not all the pages have been transmitted, the operation proceeds to step S129 to start another feeding of originals.

If transmission of all the pages has been completed, the operation proceeds to step S115 wherein determination is made as to whether processing of disconnection of the line is completed or not. If the line has not been disconnected, processing for disconnecting the line is carried out at step S123 and when trouble occurs at this time, the interruption flag is set to "1" at step S127. As a result, the operation proceeds from step S105 to step S145 after the occurrence of the problem to start discharging of the originals.

Lastly, after the completion of the line disconnection (YES at step S115), original discharging operation is started at step S117 and the following steps. When the discharging is completed, the operation proceeds from step S117 to step S119 to reset the transmission flag and then, set the manual broadcast transmission flag to "0", thereby completing the transmitting operation without using a memory.

Step S115 and the steps thereafter show processing for transmission using a memory.

That is, when transmission using a memory is set at step S103, the operation enters step S155 and proceeds to the following steps. Then, a memory-over flag is checked at step S155. This flag is to be set when the compressed image memory 51 becomes full at the time of reading the originals and the details of which will be described later.

When the memory-over flag is "0" at step S155, the operation proceeds to step S159 wherein determination is made as to whether the originals have already arrived or not. Then, feeding of the originals is carried out at step S160 until the first original reaches the image sensor portion.

After the arrival of the originals, feeding of the originals (S189), reading of the originals by the image sensor (S191), compressing of the image of the read originals (S193) and storing of the compressed image data (S193) are carried out until reading of the first page is completed (NO at step S161). If the memory becomes full at this time (YES at step S197), the interruption flag and the memory-over flag are set at steps S199 and S201, respectively, and the indication c of FIG. 5 is given to indicate that the operator should cancel the full state of the memory by transmitting the data. At step S200, the image data of the page, reading of which has been interrupted, is erased. Then, while transmission is started, the originals which have not been completely read are discharged into the discharging tray 29.

That is, when the memory is full, the operation proceeds from step S155 to step S205 to check the state of the interruption flag. When the interruption flag is set to "1", discharging operation is carried out at step S205 until discharging the originals is completed. Thereafter, the interruption flag is set to "0" at step S211 and the compressed image data is transmitted to the destination at step S167 and the following steps. Transmitting operation will be described in detail later.

Returning to the start and when reading of one-page original is finished (YES at step S161), the operation proceeds from step S163 to step S187 until feeding of the subsequent originals is completed. When one-page original arrives, the same operation will be repeated until the completion of the reading of all the originals to sequentially discharge the read originals. When reading of all the originals is finished, the read last original is discharged (S185).

Then, transmission of the compressed image data of the read originals is carried out at steps S167 through S183.

First, the line is connected at steps S167 and S183 and then, transmission of compressed image data is carried out at steps S169 and S181. At step S181, the stored image data is once expanded and then, again compressed to be transmitted in order to transmit image data on a compression system to be determined at the connection of the line. When the transmission is completed, disconnection of the line is carried out at steps S171 and S179.

In steps S173–S177, the memory-over flag, the transmission flag and the manual broadcast transmission flag are set to "0" at steps S173, S175 and S176 in order to terminate the transmitting operation and prepare for the subsequent processing and then, the indication d of FIG. 5 indicative of completion of transmission is given to complete the transmitting operation.

Figure 10:
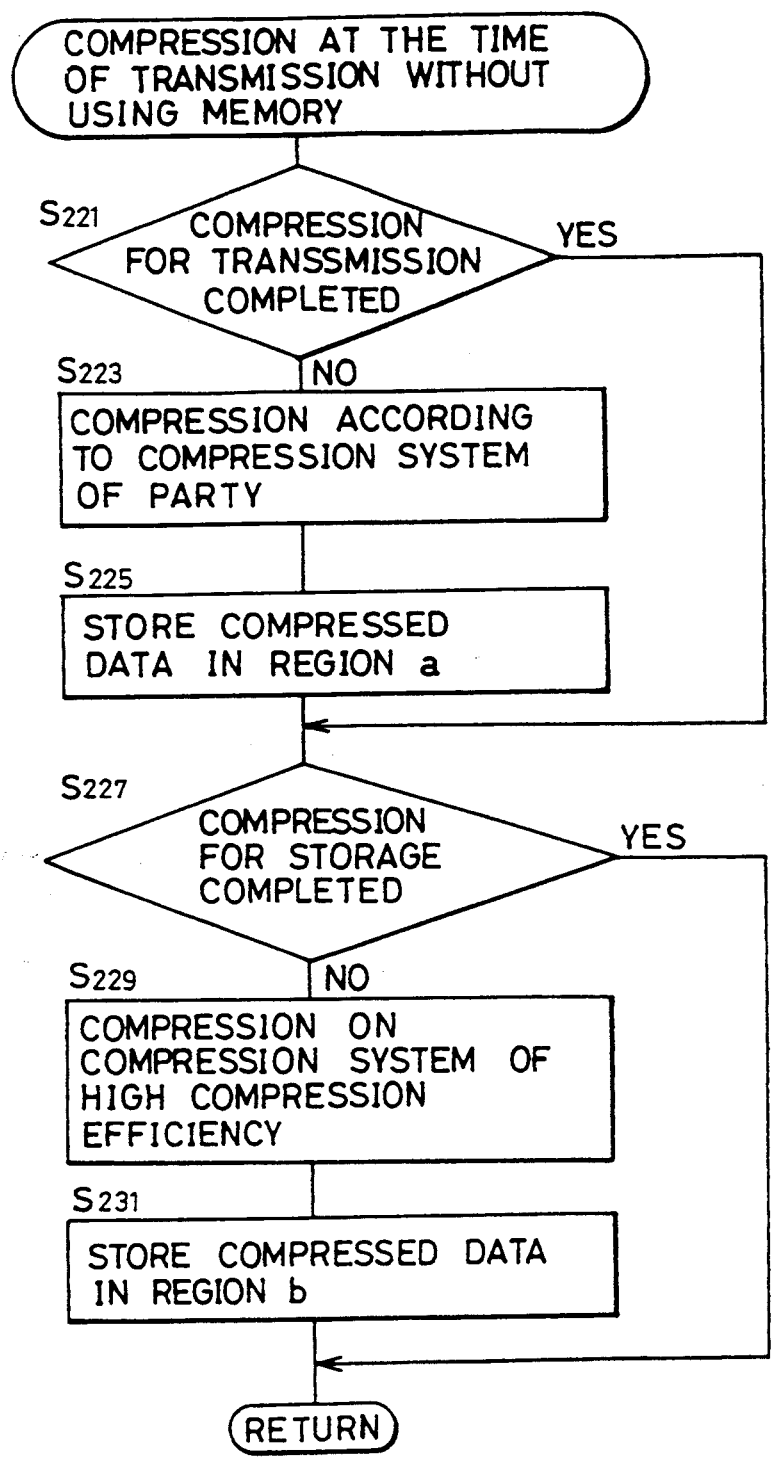
FIG. 10 is a diagram specifically showing a compression routine at the time of transmission without using a memory in FIG. 9B.

FIG. 10 is a flow chart showing compression and storage of image data at the time of transmission without using a memory of FIG. 9B.

Figure 4:
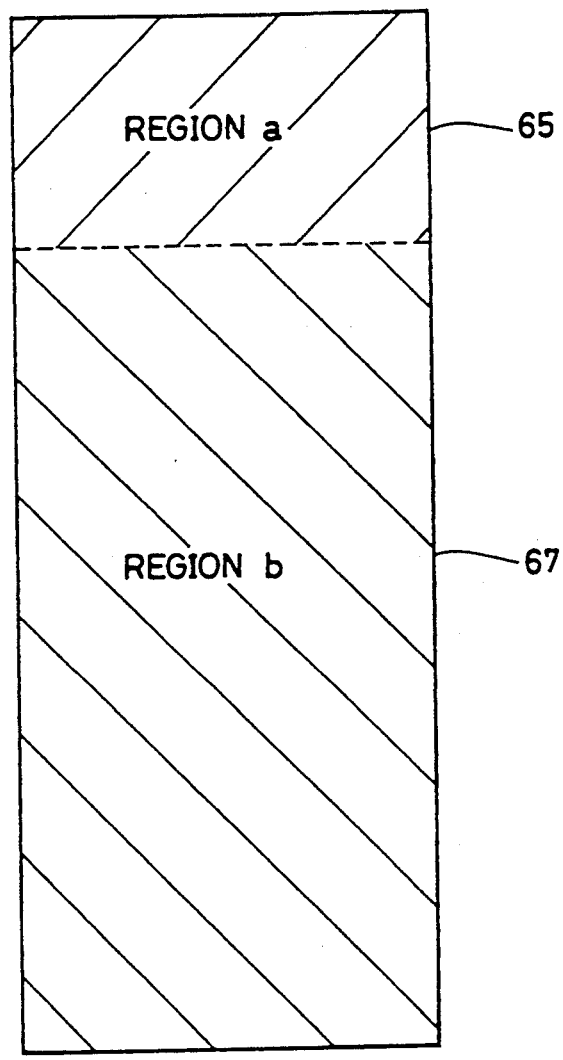
FIG. 4 is a view showing regions of a code memory portion included in a page memory portion of FIG. 3.

Prior to describing the flow chart, description will be made of a manner of using the code memory (memory for storing compressed image data) included in the page memory portion 61 with reference to FIG. 4.

First, the code memory is divided into regions a and b for use. The region a is used as a buffer for temporarily storing image data compressed by the compressing portion 60 when the data is to be transmitted to the HDLC analysis portion 52 at the time of transmission without using a memory. Therefore, the data can be directly transmitted without the region a, for example, or another memory (for example, a working memory of CPU) can replace the region a.

In this embodiment, compressed data is stored in the region a on a block (several lines) basis and sequentially transmitted to the HDLC analysis portion 52, resulting in that the transmitted data is lost on a block basis. In the flow chart of FIG. 9B, data is erased on a block basis at step S138.

On the other hand, the region b is an area for storing compressed image data at the time of transmission using a memory, wherein all the compressed image data of five originals, for example, is stored.

For the manual broadcast transmission, transmission image data should be stored also at the time of transmission without using a memory. However, image data transmitted onto the line depends on a compression system of the receiving-side apparatus and therefore, its efficiency of compression is not always high. Furthermore, addition of fill-bit also deteriorates the efficiency of compression. Therefore, in the present embodiment of the present invention, image data to be stored is generated and stored in the region b in parallel with generation of transmission data in the case of transmission without using a memory.

With reference to FIG. 10, compression is carried out on the compression system determined by the connection with the receiving-side apparatus and the compressed data is sequentially stored in the region a at steps S221 through S225.

Then, at steps S227 through S231, compression is carried out on the compression system of the highest efficiency of compression (the highest utility efficiency of the memory) and the compressed is stored in the region b.

In this embodiment, as described above, data is stored in the region b not on a block basis nor on a page basis but stored as compressed image data of a part (for example, 5 pages) of the originals. In addition, while two types of compressing operations are alternately repeated on a block basis in this embodiment, compressing operation can be repeated on a page basis with an increased region a or compressing operation can be repeated on a line basis with a reduced region a or without region a.

Figure 11A:
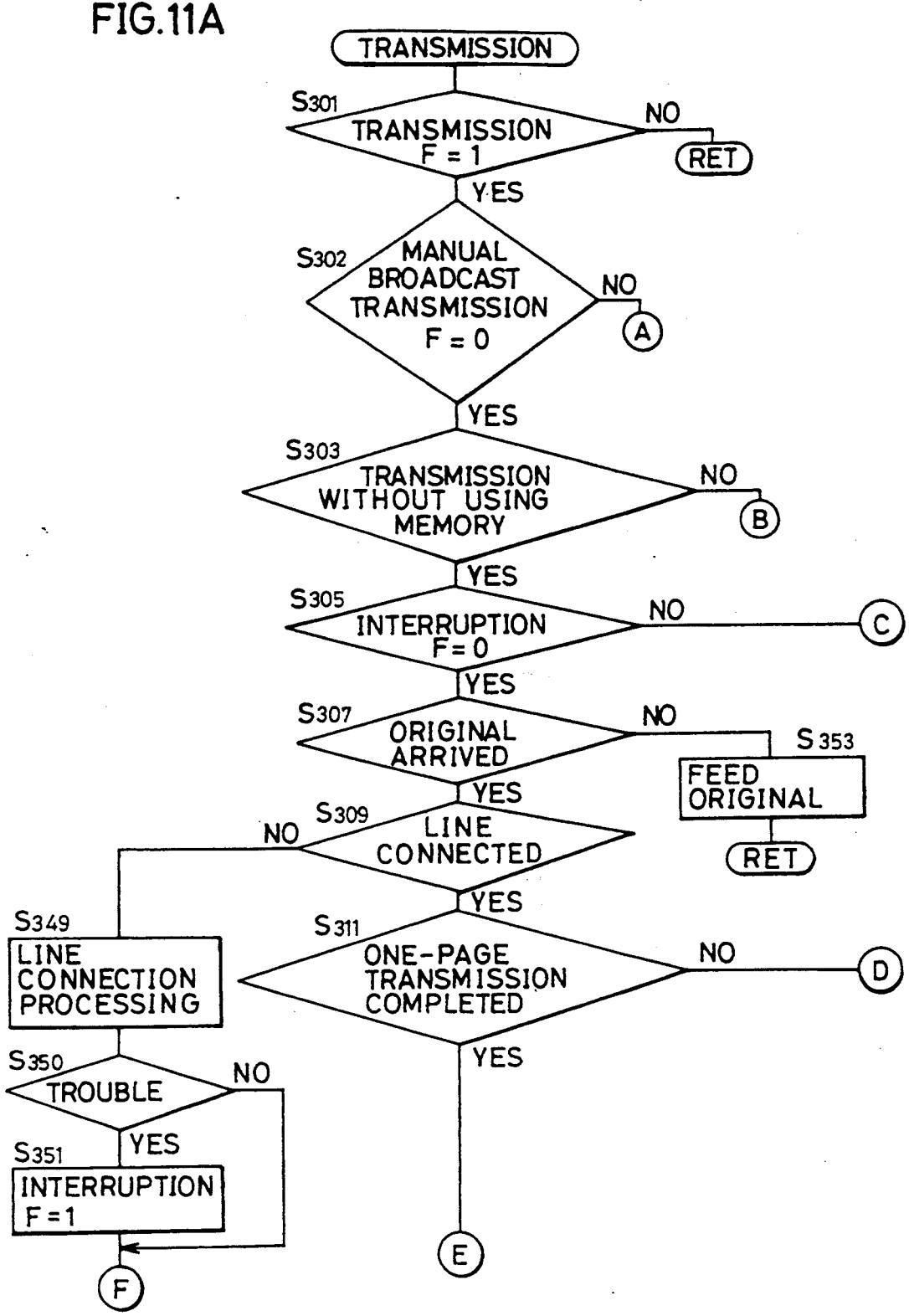
FIGS. 11A, 11B and 11C are diagrams specifically showing a transmission routine according to another embodiment of the present invention.
Figure 11B:
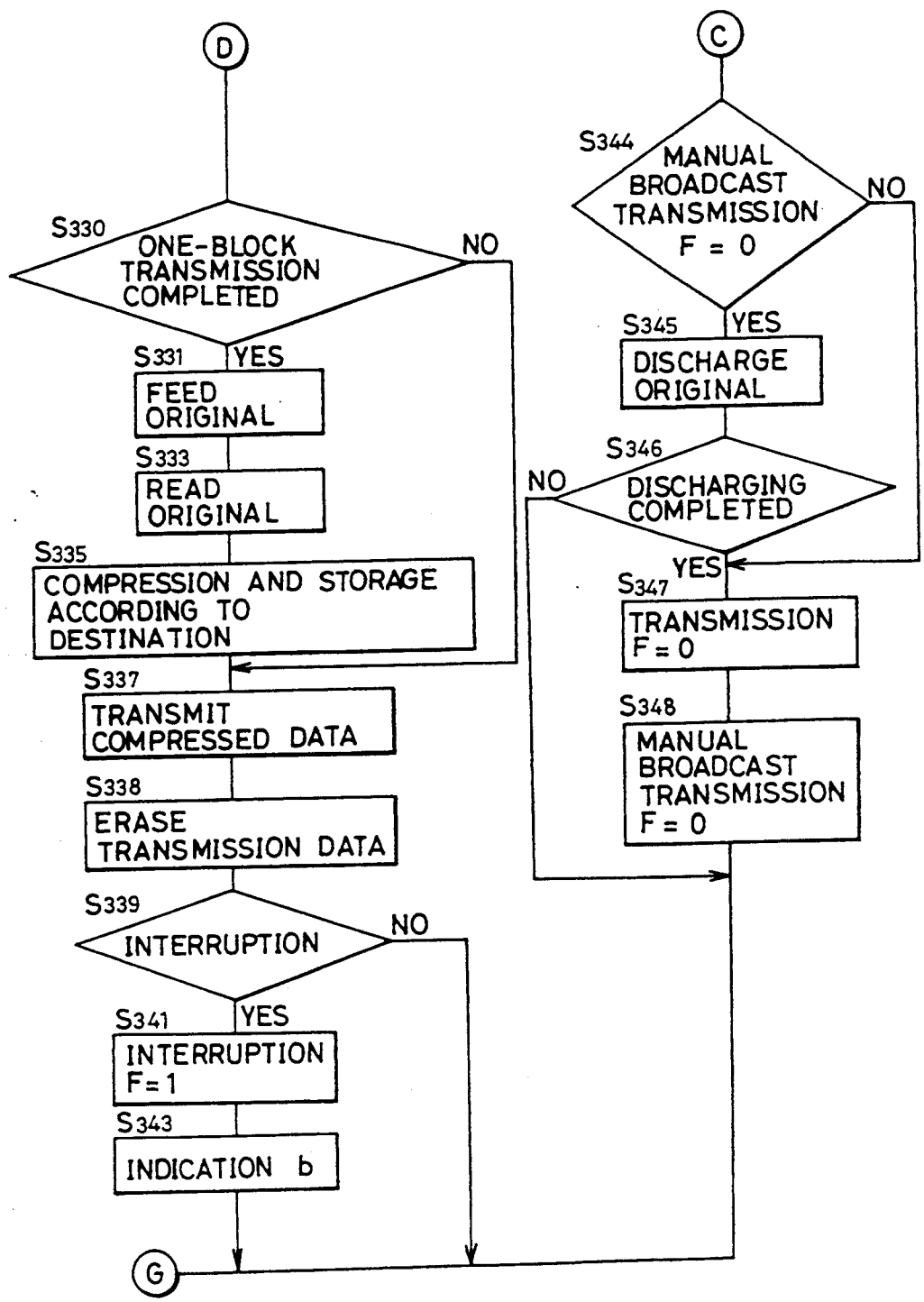
Figure 11C:
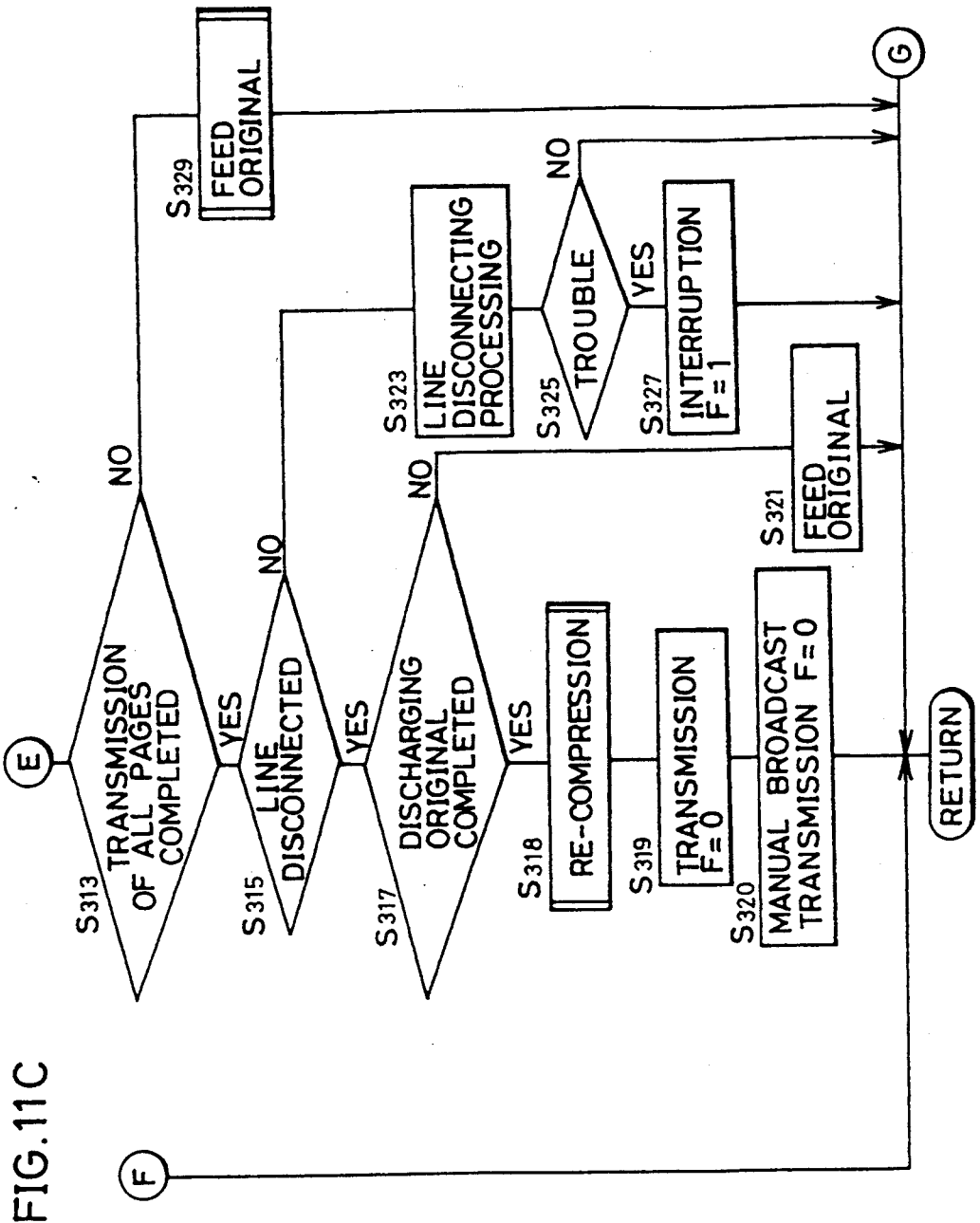

FIGS. 11A, 11B and 11C show another embodiment of the present invention and corresponds to FIG. 9A of the previous embodiment.

The flow, as a whole, of this embodiment is the same as that of the previous embodiment and therefore different points from the previous embodiment will be mainly described in the following.

In the previous embodiment, image data to be stored is generated in parallel with generation of transmission data and the image data is stored in preparation for manual broadcast transmission at step S135 in the case of transmission without using a memory. On the other hand, in the present embodiment, compressed image data is not generated in parallel but image data compressed for transmission is once stored at the time of transmitting the image (S335). Therefore, the present embodiment is advantageous over the previous embodiment in that load on the compressing/expanding portion can be reduced.

As described in the previous embodiment, however, compressed data for transmission does not always has a high efficiency of compression and therefore, the once stored compressed image data is again compressed into image data having high efficiency of compression (S318).

Figure 12:
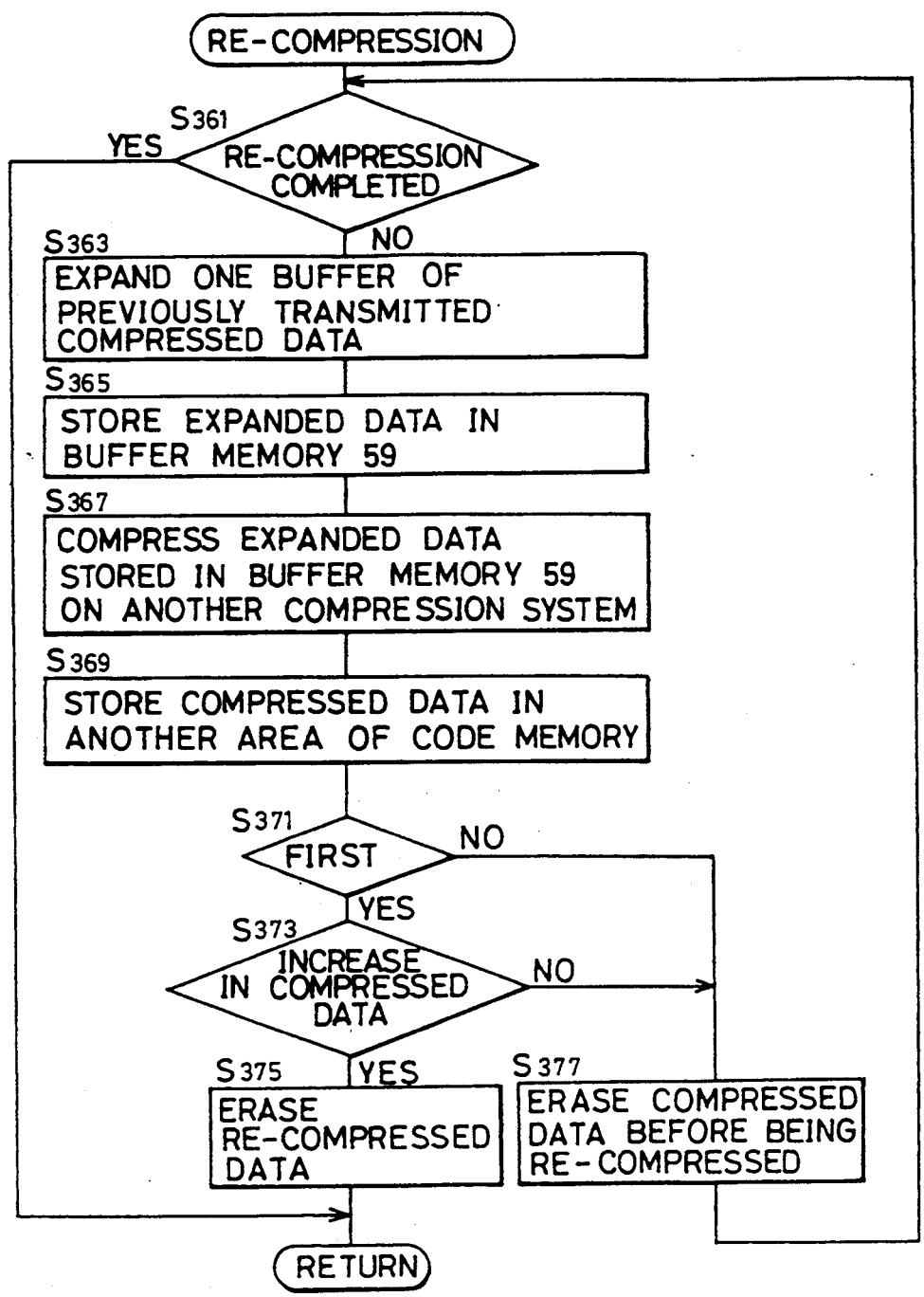
FIG. 12 is a diagram specifically showing a re-compression routine of FIG. 11C.

FIG. 12 shows a detailed sequence of re-compression at step S318 of FIG. 11C.

Before describing the specific contents of FIG. 12 necessity of re-compression will be described.

The image data stored at step S335 does not always have a high frequency of compression because the data is adapted to the capacity of compression of the receiving-side apparatus as described above. Furthermore, addition of fill-bit or the like is likely to reduce utility efficiency in use of the code memory. Then, in this embodiment, re-compression is carried out, after completion of transmission, on a compression system of high compression efficiency, which is directed to enlarging an usable area of the code memory.

In FIG. 12, re-compressing operation will be repeated at steps S363 through S369 until the re-compression is completed at step S361.

At steps S363 and S365, the compressed data as the previous transmission data is expanded to a fixed amount into actual image data (to the extent that the buffer memory 59 becomes full in this embodiment) and stored. In this case, "a fixed amount" represents a memory capacity suitable for hardware of a facsimile apparatus and it may be one line or one page, for example.

Then, re-compression is carried out on a higher efficiency compression system at steps S367 and S369. However, the compression efficiency varies depending on a type of the originals. In general, it is known that a two-dimensional coding system having a high compression efficiency for an original written in letters has its compression efficiency reduced to be lower than that of a one-dimensional coding system for halftone image such as dots.

In this embodiment, providing that a memory capacity that the compressed data occupies (YES at S373) is increased at the time of an initial expansion and re-compression of the data by "a fixed amount" (YES at S371 which has been described previously, the re-compressed data is erased (S375) to stop the re-compression. Conversely, when the memory capacity occupied by the compressed data is reduced, the compressed data corresponding to the data before being re-compressed is erased at step S377 and then, the operation returns to step S361 to repeat the above-described re-compressing operation for the entire image data.

Although in this embodiment, a comparison is made between a part of the compressed image data occupying the memory capacity and the re-compressed image data thereof at a first re-compression, a comparison can be made between a larger part of the compressed data and the re-compressed data of the same. In addition, such determination can be made for re-compression of each page or the entire image data. Furthermore, the determination made for the first page is referred to for the entire pages in this embodiment, such determination can be made on a page basis to improve such efficiency in use of the memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:

reading means for reading image data of an original to be transmitted, transmitting means for transmitting the image data read by said reading means through a telephone line in a first transmission operation, storing means for storing the image data read by said reading means substantially simultaneously with said first transmission operation by said transmitting means, inputting means, responsive to a source external of said facsimile apparatus after said first transmission operation, for commanding a transmission of the image data stored by said storing means, and controlling means responsive to the transmission command from said inputting means for controlling said transmitting means to start a second transmission operation for transmitting the image data stored by said storing means.

2. The facsimile apparatus according to claim 1, further comprising destination setting means for setting a destination for transmission of the image data stored by said storing means, wherein said controlling means controls said transmitting means to transmit the image data stored by said storing means to the destination set by said destination setting means in said second transmission operation.

3. The facsimile apparatus according to claim 2, further comprising compressing means for converting the image data read by said reading means into first compressed image data on a first compression system according to the destination and converting the image data read by said reading means into second compressed image data on a second compression system different from the first compression system, wherein said transmitting means transmits the image data converted into the first compressed image data by said compressing means and said storing means stores the image data converted into the second compressed image data by said compressing means.

4. A facsimile apparatus comprising:

reading means for reading image data of an original to be transmitted, first compressing means for converting the image data read by said reading means into first compressed image data on a first compression system, transmitting means for transmitting said converted first compressed image data through a telephone line in a first transmission operation, first storing means for storing said converted first compressed image data, second compressing means for compressing again the image data first compressed by said first compressing means and stored by said first storing means for providing second compressed image data on a second compression system different from the first compression system, second storing means for storing said converted second compressed image data destination setting means for setting a destination for transmission of the second compressed image data stored by said second storing means, inputting means, responsive to a source external of said facsimile apparatus after said first transmission operation, for commanding a transmission of the second compressed image data stored by said second storing means, and controlling means responsive to the transmission command by said inputting means for controlling said transmitting means to start a second transmission operation for transmitting the image data to the destination set by said destination setting means.

5. The facsimile apparatus according to claim 4, wherein the first compression system for use in said first compressing means is a compression system according to processing conditions of a destination and the second compression system for use in said second compressing means is a compression system for effectively storing image data in said second storing means.

6. The facsimile apparatus according to claim 4, further comprising:

comparing means for comparing compression efficiencies between said first compressed image data and said second compressed image data to determine a compression system of higher compression efficiency, storage controlling means for controlling said first and second storing means to selectively store the compressed image data of higher compression efficiency determined by said comparing means, destination setting means for setting a destination for transmission of the image data, inputting means for commanding a transmission of the image data to said destinations and transmission controlling means responsive to the transmission command from said inputting means for controlling said transmitting means to start a second transmission operation for transmitting the compressed image data selected by said storage controlling means to the destination set by said destination setting means.

7. A method in a facsimile apparatus, comprising:

a first step of setting a first destination, a second step of reading image data of an original, a third step of transmitting the image data read in the second step to the first destination through a telephone line in a first transmission operation, a fourth step of storing the image data read in the second step substantially simultaneously with said first transmission operation of transmitting the image data in the third step, a fifth step of accepting, from a source external of said facsimile apparatus, an entry for a second destination different from the first destination after the first transmission operation of transmitting the image data in the third step, and a sixth step of transmitting the image data stored in the fourth step to the second destination accepted in the fifth step through the telephone line in a second transmission operation.

8. A method according to claim 9, further comprising:

a seventh step of compressing the image data read in the second step into first compressed image data on a first compression system according to a processing condition of a destination, wherein the first compressed image data is transmitted in the first transmission operation in the third step and stored in the fourth step, an eighth step of expanding the first compressed image data stored in the fourth step into restored image data, a ninth step of compressing the restored image data expanded in the eighth step into second compressed image data on a second compression system according to a predetermined condition, and a tenth step of storing the second compressed image data compressed in the ninth step.

* * * * *

UNITED STATES PATENT AND TRADEMARK OFFICE
CERTIFICATE OF CORRECTION

PATENT NO. : 5,363,206
DATED : November 8, 1994
INVENTOR(S) : Shigenobu Fukushima It is certified that error appears in the above-indentified patent and that said Letters Patent is hereby corrected as shown below:

On the cover page, in line 9 of the Abstract paragraph, after "responsive" insert --to the transmission command from the commanding device--.

In col. 6, line 63, after "to" insert --"0"--.

In col. 11, line 57 (Claim 4, line 19), after "data" insert --,-- (comma).

In col. 12, line 24 (Claim 6, line 15), change "destinations and" to --destination, and--.

In col. 12, line 50 (Claim 8, line 1), change "9" to --7--.

Signed and Sealed this

Sixteenth Day of May, 1995

Attest:

BRUCE LEHMAN

*Attesting Officer*          *Commissioner of Patents and Trademarks*